United States Patent
Zhou et al.

(10) Patent No.: US 11,677,150 B2
(45) Date of Patent: Jun. 13, 2023

(54) ANTENNA AND TERMINAL DEVICE

(71) Applicant: BEIJING XIAOMI MOBILE SOFTWARE CO., LTD., Beijing (CN)

(72) Inventors: Mingming Zhou, Beijing (CN); Min Li, Beijing (CN); Yu chuan Su, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 261 days.

(21) Appl. No.: 16/745,437

(22) Filed: Jan. 17, 2020

(65) Prior Publication Data

US 2021/0083384 A1    Mar. 18, 2021

(30) Foreign Application Priority Data

Sep. 17, 2019  (CN) .......................... 201910877627.8

(51) Int. Cl.
*H01Q 5/371*  (2015.01)
*H01Q 1/24*  (2006.01)
*H01Q 1/48*  (2006.01)
*H01Q 1/52*  (2006.01)
*H04M 1/02*  (2006.01)
*H04W 84/12*  (2009.01)

(52) U.S. Cl.
CPC ............ *H01Q 5/371* (2015.01); *H01Q 1/243* (2013.01); *H01Q 1/48* (2013.01); *H01Q 1/52* (2013.01); *H04M 1/0264* (2013.01); *H04M 2201/38* (2013.01); *H04W 84/12* (2013.01)

(58) Field of Classification Search
CPC ............ H04M 1/0264; H04M 2201/38; H01Q 1/243; H01Q 5/371–392
See application file for complete search history.

(56) References Cited

U.S. PATENT DOCUMENTS

| | | | |
|---|---|---|---|
| 6,985,114 B2 * | 1/2006 | Egashira | H01Q 9/42 |
| | | | 343/702 |
| 8,269,676 B2 * | 9/2012 | Lin | H01Q 5/40 |
| | | | 343/702 |
| 9,484,631 B1 * | 11/2016 | Napoles | H01Q 5/378 |
| 2004/0169611 A1 | 9/2004 | Korva | |

(Continued)

FOREIGN PATENT DOCUMENTS

| | | |
|---|---|---|
| CN | 105027352 A | 11/2015 |
| CN | 106785348 A | 5/2017 |

OTHER PUBLICATIONS

Extended European Search Report in U.S. Appl. No. 20/157,683, dated Sep. 16, 2020.

*Primary Examiner* — Hasan Islam (74) *Attorney, Agent, or Firm* — Syncoda LLC; Feng Ma (57) ABSTRACT

An antenna includes a feed contact, a first antenna branch and a second antenna branch, wherein the first antenna branch and the second antenna branch are respectively electrically connected with the feed contact, forming electromagnetic coupling; the first antenna branch has a specified length for sending and receiving signals in a first frequency band; and the second antenna branch has a specified length for sending and receiving signals in a second frequency band. A terminal device including such an antenna can have improved appearance, improved effect of receiving communication signals in different frequency bands, reduced RF loss, and improved the utilization of the internal space.

16 Claims, 5 Drawing Sheets

(56) References Cited

U.S. PATENT DOCUMENTS

| | | |
|---|---|---|
| 2007/0132641 A1 | 6/2007 | Korva et al. |
| 2007/0188388 A1 | 8/2007 | Feng et al. |
| 2009/0027299 A1 | 1/2009 | Peng et al. |
| 2010/0156726 A1* | 6/2010 | Montgomery ........... H01Q 9/42 343/700 MS |
| 2013/0285870 A1* | 10/2013 | Hotta .................... H01Q 5/371 343/843 |
| 2018/0048076 A1 | 2/2018 | Wei |

* cited by examiner

ANTENNA AND TERMINAL DEVICE

CROSS-REFERENCE TO RELATED APPLICATION

This application claims priority to Chinese Patent Application No. 201910877627.8 filed on Sep. 17, 2019, the disclosure of which is hereby incorporated by reference in its entirety.

BACKGROUND

With the rapid development of communication technologies, data signal network transmission has been developed to 5G. At the same time, communication devices, such as mobile phones, also need to be compatible with 2G, 3G, and 4G networks, and receive wireless fidelity (Wi-Fi) signals. The number of communication bands is constantly increasing. Moreover, carrier aggregation (CA) and multiple-input multiple-output (MIMO) are required for different communication networks, and the number of antennas is constantly increasing. The appearance design of flagship mobile phones constantly results in reducing the available space of antennas, and multi-band antennas have become a trend of mobile phone antennas.

SUMMARY

According to a first aspect of embodiments of the present disclosure, there is provided an antenna, including: a feed contact, a first antenna branch and a second antenna branch, wherein the first antenna branch and the second antenna branch are respectively electrically connected with the feed contact, forming electromagnetic coupling; the first antenna branch has a specified length for sending and receiving a first frequency band signals; and the second antenna branch has a specified length for sending and receiving a second frequency band signals.

In some embodiments, the antenna further includes a third antenna branch which is electrically connected with the feed contact; the first antenna branch, the second antenna branch and the third antenna branch form electromagnetic coupling; and the third antenna branch has a specified length for sending and receiving a third frequency band signals.

In some embodiments, the first antenna branch, the second antenna branch and the third antenna branch are integrally formed in L-shape; the first antenna branch is taken as a first side of the L shape, the second antenna branch is taken as a second side of the L shape, and the third antenna branch is disposed at a corner of the L shape formed by the first antenna branch and the second antenna branch.

In some embodiments, the antenna further includes a first grounding point and a second grounding point; the first antenna branch is grounded through the first grounding point; and the second antenna branch is grounded through the second grounding point.

In some embodiments, the third antenna branch is grounded through the first grounding point.

In some embodiments, the first frequency band signal is Wi-Fi 2.4 GHz frequency band signal, the second frequency band signal is N78 frequency band signal, and the third frequency band signal is Wi-Fi 5 GHz frequency band signal.

According to a second aspect of embodiments of the present disclosure, there is provided a terminal device, including a first antenna which is the antenna according to the first aspect or any embodiment of the first aspect.

In some embodiments, the terminal device further includes a second antenna; and the first antenna is spaced from the second antenna with a specified distance.

In some embodiments, the second antenna is a Combo antenna.

In some embodiments, the first antenna is disposed at a non-grip area of the terminal device.

In some embodiments, the terminal device further includes a rear camera Deco; the non-grip area includes areas near two adjacent sides of the rear camera Deco; the first antenna branch of the first antenna is spaced from one side of the two adjacent sides of the camera Deco with a first specified distance, the second antenna branch of the first antenna is spaced from the other side of the two adjacent sides of the camera Deco with a second specified distance, and the third antenna branch of the first antenna is disposed at a corner of the two adjacent sides.

In some embodiments, the terminal device further includes a battery; and the first antenna branch or the second antenna branch are disposed between the camera Deco and the battery.

In some embodiments, the terminal device further includes a frame connected with the second antenna; the first antenna branch is disposed between the camera Deco and the battery; and the second antenna branch is disposed between the camera Deco and the frame.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the invention and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Various embodiments of the present disclosure can address that mobile phone antennas often use frame slot structure which would damage the overall appearance of mobile phones with poor effect of receiving communication signals in different frequency bands while increasing RF loss and reducing the internal space utilization of the terminal device.

Figure 1:
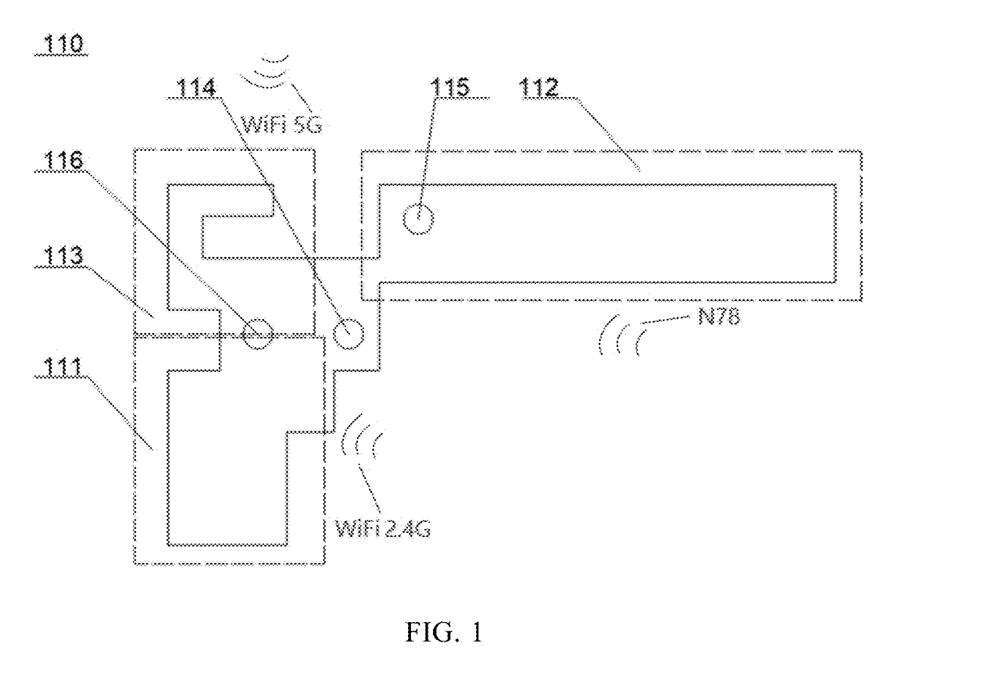
FIG. 1 is a schematic diagram illustrating an antenna structure according to an exemplary embodiment of the present disclosure.

FIG. 1 is a schematic structural view of an antenna according to an exemplary embodiment of the present disclosure.

Referring to FIG. 1, the antenna 100 includes a feed contact 114, a first antenna branch 111 and a second antenna branch 112. The first antenna branch 111 and the second antenna branch 112 are respectively electrically connected with the feed contact 114, and form electromagnetic coupling therebetween. The first antenna 111 has specified length for sending and receiving first frequency band signals. The second antenna 112 has specified length for sending and receiving second frequency band signals.

The antenna in the present the embodiment has a structure mentioned above. Specifically, the first antenna branch is configured to receive Wi-Fi signals; the second antenna branch is configured to receive N78 frequency band signals; and the first antenna branch and the second antenna branch are connected with each other to form a multi-band antenna to realize the MIMO function of the antenna. Two antenna branches receive signals in different frequency bands through one feed contact. According to the principle of relations between the antenna and the signal wavelength, it is to be known that the longer the length of the antenna is, the shorter the wavelength of the received communication signal is. Therefore, in the present embodiment, two antenna branches are configured to have different lengths to achieve the function of respectively receiving communication signals in different wavelengths, thereby reducing RF loss and improving the effect of receiving communication signals in different frequency bands. The first antenna branch and the second antenna branch are connected with each other to form a monolithic antenna component structure. Current is distributed on the two branches. The two branches have resonance relationship. In the adjusting phase, if the length of one branch is adjusted, other branches also need to be adjusted. The structure of the antenna is simplified and the internal space of the terminal device is effectively utilized. No hole is required to be formed on a frame of a terminal device, so the appearance of the terminal device is beautified.

Wi-Fi is a technology that allows electronic devices to connect to a wireless local area network (WLAN), typically using 2.4 G UHF or 5G SHF ISM radio frequency band. The 2.4 GHz band can accommodate about 11 channels, but with the popularity of various IT devices, iPad, mobile phones, PCs, game consoles, and the like are all used in this frequency band, which results in the severe decline of throughput values when multiple devices are used simultaneously. Furthermore, microwave ovens, Bluetooth, and wireless mice also use the 2.4 GHz band, which may also interfere with other connected devices. However, there are not many devices working in the 5 GHz band, and the number of the 5 GHz channels is several times more than 2.4 GHz channels, so the congestion problem can be well solved. As to the disadvantages of the 5 GHz band, the first is that there are fewer supported devices, and the second is that the penetration is slightly worse, since the worse the penetration is, the higher the frequency is. In order to better receive Wi-Fi signals, most current dual-band routers support 2.4 GHz and 5 GHz working simultaneously. Therefore, in the present embodiment, the band range of the Wi-Fi signals received by the first antenna branch may be 2.4 GHz-5 GHz.

In some embodiments, the antenna further includes a third antenna branch 113 which is electrically connected with the feed contact 114. The first antenna branch 111, the second antenna branch 112 and the third antenna branch 113 form electromagnetic coupling. The third antenna branch 113 has specified length for sending and receiving third frequency band signals.

As the first antenna branch, the third antenna branch and the second antenna branch are respectively connected with the feed contact, the three branches are completely connected. Current is distributed on the three branches. The three branches have resonance relationship. In the adjusting phase, if the length of one branch is adjusted, other branches also need to be adjusted. The antenna in the present embodiment can receive Wi-Fi signals and sub 6 GHz signals simultaneously, and Wi-Fi signals may include signals in 2.4 GHz and 5 GHz frequency bands. The first antenna branch and the third antenna branch are configured to receive Wi-Fi frequency band signals, wherein the first antenna branch is configured to receive Wi-Fi 2.4 GHz frequency band signals, the third antenna branch is configured to receive Wi-Fi 5 GHz frequency band signals. The second antenna branch is configured to receive N78 frequency band signals. The antenna applicable for three frequency bands has wider scope of application.

In actual implementation, the structure of the antenna may be designed according to actual specific internal structure of the terminal device, circuit design and the like. The length of the first antenna branch, the third antenna branch or the second antenna branch may be adjusted according to the precision requirement on receiving Wi-Fi 2.4 GHz, Wi-Fi 5 GHz and second frequency band signals, thereby realizing multiple antenna structure modes combined with three frequency bands.

In some embodiments, the first antenna branch 111, the second antenna branch 112 and the third antenna branch 113 are integrally formed in L-shaped. The first antenna branch 111 is taken as a first side of the L shape, the second antenna branch 112 is taken as a second side of the L shape, and the third antenna branch 113 is disposed at a corner of the L shape formed by the first antenna branch 111 and the second antenna branch 112.

The antenna in the present embodiment has a L-shaped structure as shown in FIG. 1. Herein, the first antenna branch and the second antenna branch are respectively formed on two sides of the L shape, the third antenna branch is formed at an intersection of the two sides. The first antenna branch, the third antenna branch and the second antenna branch are all connected to the feed contact. The antenna may be disposed at an L-shaped gap formed by at least two components disposed in the terminal device, so as to effectively utilize the internal space of the terminal device.

According to the above-mentioned theory of the relationship between the antenna length and the signal band, in order to better achieve the effect of receiving signals in different frequency bands, the lengths of the respective antenna branch must be reasonably designed to adapt to the different signal bands.

Figure 2:
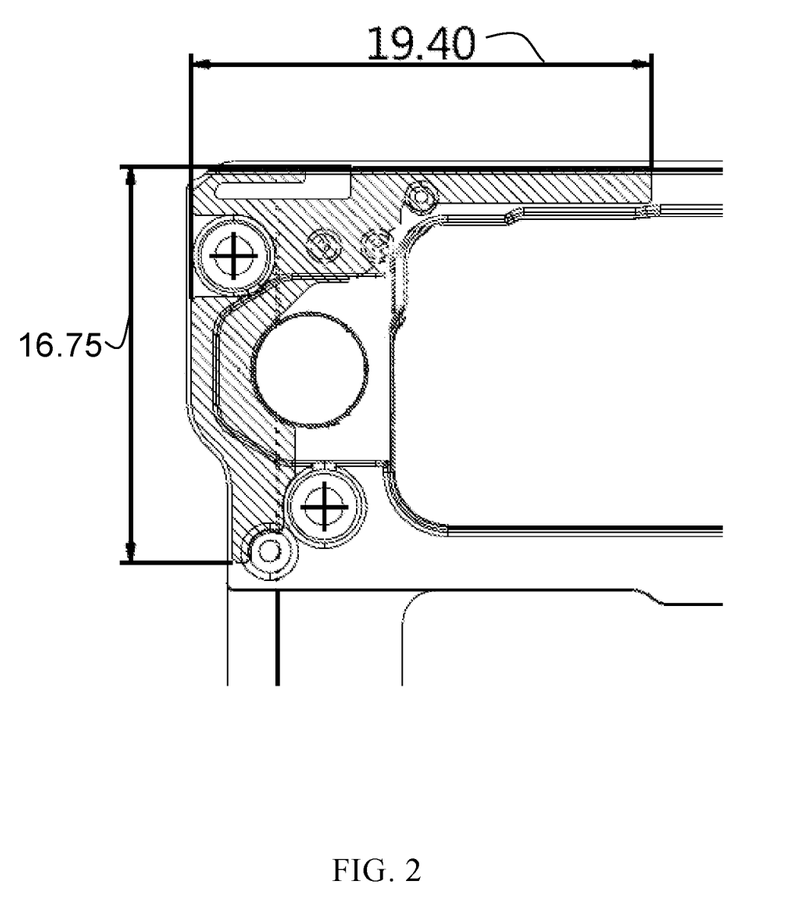
FIG. 2 is a schematic diagram illustrating the length design of a first antenna branch and a second antenna branch of the antenna according to an exemplary embodiment of the present disclosure.
Figure 3:
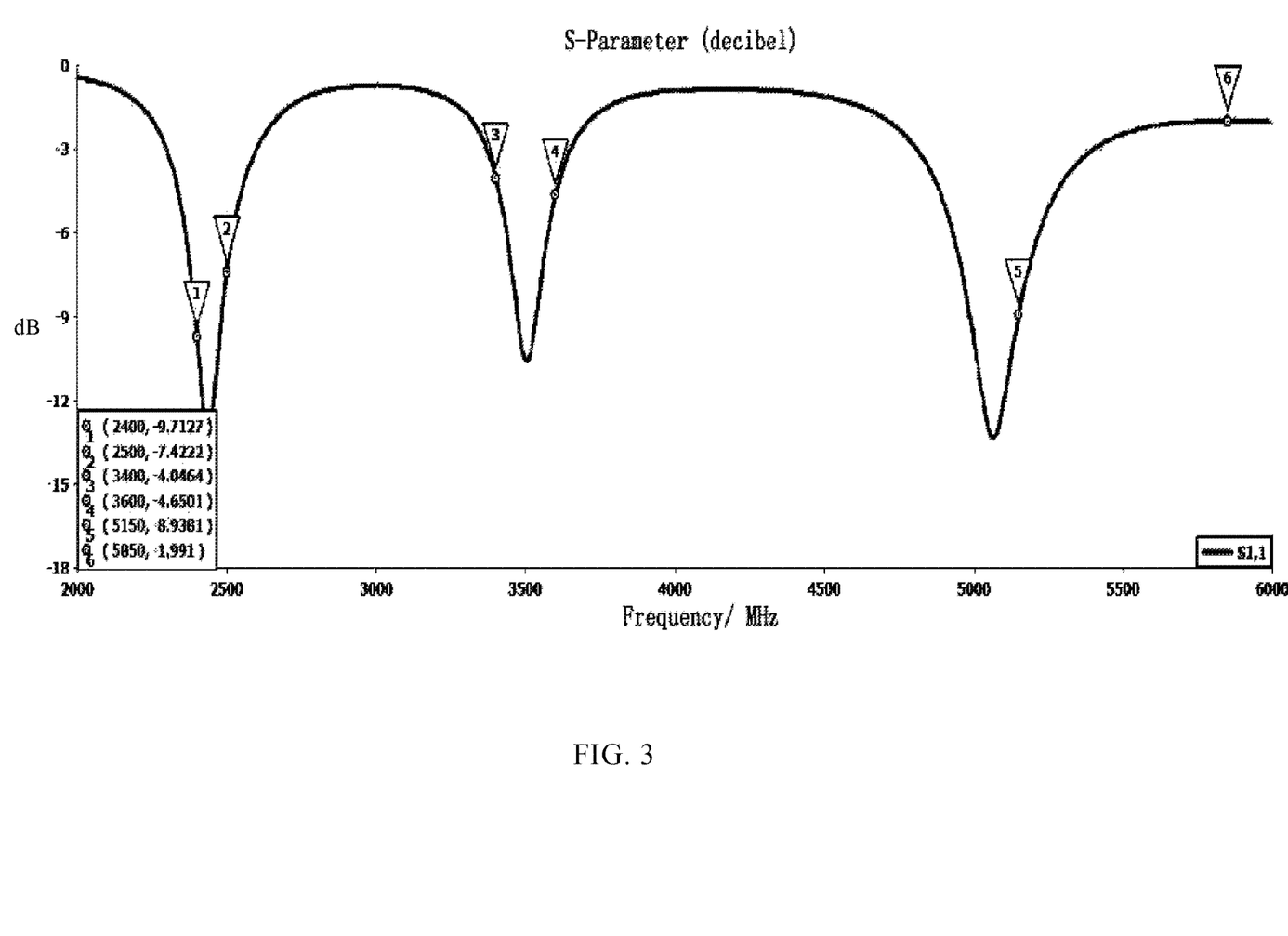
FIG. 3 is a simulation effect graph of the length and the frequency as shown in FIG. 2 of the first antenna branch and the second antenna branch of the antenna according to the exemplary embodiment of the present disclosure.

As one example of the length design of the antenna, FIG. 2 is a schematic diagram illustrating the length design of the first antenna branch, the third antenna branch and the second antenna branch of the antenna according to the exemplary embodiment of the present disclosure. FIG. 3 is a simulation effect graph of the length and the frequency as shown in FIG. 2 of the first antenna branch, the third antenna branch and the second antenna branch of the antenna according to the exemplary embodiment of the present disclosure.

As described above, the three antenna branches may be configured to respectively receive signals in three frequency bands by adjusting the length of the other two antenna branches if the length of one antenna branch is determined. In the above L-shaped antenna, as the third antenna branch is disposed at the corner of the L shape, the total length of the first antenna branch and the third antenna branch or the total length of the second antenna branch and the third antenna branch may be adjusted. Referring to FIG. 2, in the example, the total length of the first antenna branch and the third antenna branch is determined as 16.75 mm, or the total length of the second antenna branch and the third antenna branch is determined as 19.4 mm. Correspondingly, referring to FIG. 3, points 1 and 2 indicate the simulation effect of Wi-Fi 2.4 GHz signals received by the first antenna branch, and points 3 and 4 indicate the simulation effect of second frequency band signals received by the second antenna branch, and good signal reception effect is achieved.

The integrated structure of the multi-band signal antenna is effectively realized through the above design of the length and the structure, and the effect of the antenna in receiving signals in various frequency bands is improved. In addition, the mutual signal interference between various antennas needs to be considered. The factors that have a greater impact on signal interference involve the grounding of the antenna.

In some embodiments, referring to FIG. 1, the antenna further includes a first grounding point 116 and a second grounding point 115. The first antenna branch 111 is grounded through the first grounding point 116, and the second antenna branch 112 is grounded through the second grounding point 115.

The first antenna branch and the second antenna branch are provided with respective grounding points, namely the first antenna branch is electrically connected with the first grounding point and the second antenna branch is electrically connected with the second grounding point, thereby avoiding the signal interference between the two antenna branches and improving the effect of the antenna in receiving multi-band signals.

According to the actual situation of receiving the signals, the grounding point of the third antenna branch may be independently provided with one grounding point, or may share one grounding point with the antenna branch for sending and receiving similar signals.

In some embodiments, the third antenna branch 113 is grounded through the first grounding point 116.

As described above, in the embodiment of the present disclosure, both the third antenna branch and the first antenna branch are configured to send and receive Wi-Fi signals in different frequency bands, specifically, the first antenna branch is configured to send and receive Wi-Fi 2.4 GHz frequency band signals, and the third antenna branch is configured to send and receive Wi-Fi 5 GHz frequency band signals. As the two branches are configured to send and receive the Wi-Fi signals, the first antenna branch and the third antenna branch may be grounded through the same grounding point. In the embodiment, both the first antenna branch and the third antenna branch are grounded through the first grounding point.

Based on the above technical solutions, the antenna of the present application can effectively achieve the effect of receiving multi-band signals. In actual design and manufacturing process, the stability of the antenna also needs to be considered.

Figure 4:
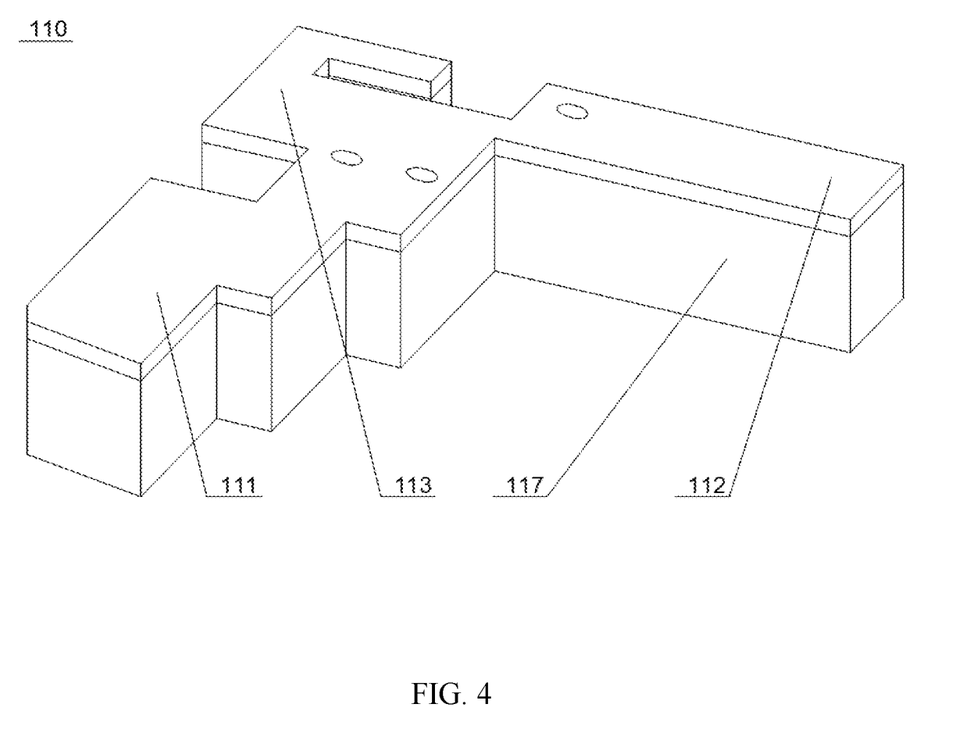
FIG. 4 is a perspective view illustrating an antenna structure according to an exemplary embodiment of the present disclosure.

FIG. 4 is a structural perspective view illustrating the first antenna branch of the antenna according to the exemplary embodiment of the present disclosure.

Referring to FIG. 4, in some embodiments, the antenna further includes an antenna supporter 117 on which the first antenna branch 111 and the second antenna branch 112 are disposed.

The antenna supporter is configured for fixing antenna branches and connecting with a terminal housing in the terminal device.

As to the connection between the antenna and the antenna supporter, what needs to be considered is to facilitate manufacturing and save costs while ensuring the performances of the antenna.

In some embodiments, the first antenna branch 111 and the second antenna branch 112 are coatings on the antenna supporter 117. The antenna is formed by coatings on the antenna supporter, which facilitates the manufacturing of the antenna and saves the cost.

The above antenna forms MIMO multi-band antenna. The above antenna may be applied in various terminal devices to enhance the communication capability of the terminal devices.

Figure 5:
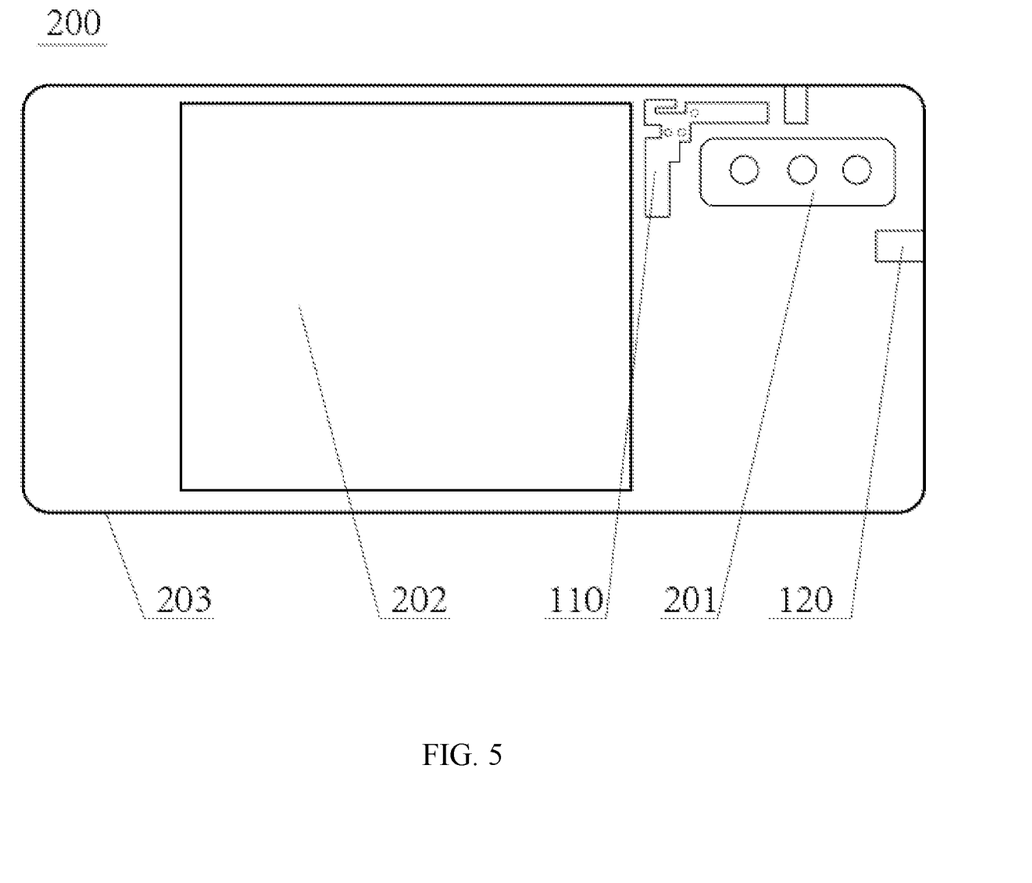
FIG. 5 is a schematic diagram illustrating a terminal structure according to an exemplary embodiment of the present disclosure.

The present disclosure provides a terminal device. FIG. 5 is a schematic diagram of a terminal structure according to an exemplary embodiment of the present disclosure.

Referring to FIG. 5, the terminal device 200 includes a first antenna 110 which is the antenna according to the above embodiment.

The above antenna is applied to the terminal device in which the first antenna branch is configured to receive Wi-Fi 2.4 GHz frequency band signals, the second antenna branch is configured to receive N78 frequency band signals, the third antenna branch is configured to receive Wi-Fi 5 GHz frequency band signals; and the first antenna branch, the third antenna branch and the second antenna branch are connected with each other to form a multi-band antenna to realize the MIMO function of the antenna. The Wi-Fi antenna branch and the Sub 6 GHz antenna branch have respective grounding points, that is, the Wi-Fi antenna branches (i.e. the first antenna branch and the third antenna branch) are electrically connected with the first grounding point, and the second antenna branch (i.e. the Sub 6 GHz antenna branch) is electrically connected with the second grounding point, thereby avoiding the signal interference of the antenna branches for receiving different signals, and improving the effect of the antenna in receiving multi-band signals. The three antenna branches receive signals in different frequency bands through one feed contact. As can be known from the relationship principle of the antenna and the signal wavelength, the longer the length of the antenna is, the shorter the wavelength of the received communication signal is. Therefore, in the embodiment, the antenna branches have different lengths to realize the function of respectively receiving communication signals in different wavelengths, while reducing RF loss and improving the effect of receiving communication signals in different frequency bands. The first antenna branch, the second antenna branch and the third antenna branch form an overall component, which simplifies the structure of the antenna and effectively utilizes the internal space of the terminal device. As no hole is required to be formed on a frame of the terminal device, the appearance of the terminal device is beautified.

In the terminal device, in order to further enhance the signal receiving capacity of the terminal device, the above antenna may also be cooperated with other antennas.

In order to satisfy user requirements and design demands, in the embodiment, the antenna further includes a second antenna. The first antenna and the second antenna need to be cooperated to receive signals. Thus, the first antenna and the second antenna need to be arranged at close positions. However, in order to avoid the signal interference between the first antenna and the second antenna, certain gap must be kept between the first antenna and the second antenna, and the specific gap size depends on the actual situation, as long as there is no contact therebetween.

In some embodiments, the terminal device further includes a second antenna 120 which is spaced from the first antenna 110 in a specified distance.

In some embodiments, the second antenna 120 is a Combo antenna.

In the embodiment, a Combo antenna is used as the second antenna. The Combo antenna is a commonly used antenna inside the communication terminal device. The Combo antenna may be used to receive positioning signals such as GPS signals for positioning. The Combo antenna may also be used in conjunction with the first antenna to receive communication signals, thereby increasing the frequency bands of the signals received by the terminal device, and enhancing the function of receiving signals in the terminal device.

As a component for receiving communication signals, the layout of the antenna in the terminal device must avoid the interference of external factors to ensure good signal reception effect. In actual application scene, if the antenna layout area is covered by the hand when a user is holding the terminal device, the effect of the antenna in receiving signals will be affected.

In some embodiments, the first antenna 110 is disposed on a non-grip area of the terminal device to ensure good signal receiving effect of the antenna. The specific setting position of the non-grip area may be determined according to the internal structure of the specific terminal device, the usage mode, and the like.

In some embodiments, the terminal device further includes a rear camera Deco 201. The non-grip area includes areas close to two adjacent sides of the rear camera Deco 201. The first antenna branch 111 of the first antenna 110 is arranged close to one of the adjacent sides of the camera Deco 201 with first specified distance, the second antenna branch 112 of the first antenna 110 is arranged close to one of the adjacent sides of the camera Deco 201 with second specified distance, and the third antenna branch 113 of the first antenna 110 is disposed at a corner of the two adjacent sides.

In the terminal device such as the mobile phone, the rear camera is disposed at an upper part of the terminal device. The mobile phone can further include a display screen, such as a liquid-crystal display (LCD) or an organic light-emitting diode (OLED) display screen.

When a user holds the terminal device, the hand would not touch the upper part normally. Thus, in the embodiments, the first antenna is arranged near the rear camera Deco, and specified distance is spaced between the first and second antenna branches and two adjacent sides of the camera Deco 201, thereby avoiding the signal interference between the antenna and the camera Deco, effectively utilizing the internal space of the terminal device, and solving the problem of poor effect in receiving communication signals as the first antenna is covered by the hand.

Moreover, in the present disclosure, the terminal device is further provided with a grounding point for the camera Deco to be grounded, thereby avoiding the signal coupling between the camera Deco and the antenna.

In order to achieve good layout of antenna settings, the position of the antenna needs to be considered in combination with other components inside the terminal device. In some embodiments, the terminal device further includes a battery 202, and the first antenna branch 111 or the second antenna branch 112 is disposed between the camera Deco 201 and the battery 202.

The first antenna branch or the second antenna branch is disposed at one end of the camera Deco close to the battery, thereby effectively utilizing the internal space of the terminal device.

In some embodiments, the terminal device further includes a frame 203 connected with the second antenna 120. The first antenna branch 111 is disposed between the camera Deco and the battery, the second antenna branch 112 is disposed between the camera Deco 201 and the frame 203, thereby effectively utilizing the internal space of the terminal device, reducing the probability of the antenna being touched by the hand, and improving the signal receiving effect of the antenna.

Various embodiments in the present disclosure can have one or more of the following advantages. The appearance of terminal devices can become more aesthetically pleasing. The effect of receiving communication signals in different frequency bands can be improved, while reducing RF loss, and improving the utilization of the internal space of the terminal device.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

The invention claimed is:

1. An antenna, comprising:
a feed contact, a first antenna branch, a second antenna branch, and a third antenna branch; wherein
the first antenna branch, the second antenna branch, and the third antenna branch are respectively electrically connected with the feed contact;
the first antenna branch has a first length for sending and receiving signals in a first frequency band;
the second antenna branch has a second length for sending and receiving signals in a second frequency band different from the first frequency band;
the third antenna branch has a third length for sending and receiving signals in a third frequency band different from the first and second frequency bands;
the first antenna branch, the second antenna branch, and the third antenna branch form electromagnetic coupling;
the first antenna branch, the second antenna branch, and the third antenna branch are integrally formed in an L-shape, such that the first antenna branch is formed as a first side of the L shape, the second antenna branch is formed as a second side of the L shape, and the third antenna branch is disposed at a corner of the L shape formed by the first antenna branch and the second antenna branch; and
at least one of the three frequency bands is for Wi-Fi signals and another of the three frequency bands is for sub 6 GHz signals.

2. The antenna of claim 1, further comprising a first grounding point and a second grounding point;
the first antenna branch is grounded through the first grounding point; and
the second antenna branch is grounded through the second grounding point.

3. The antenna of claim 2, wherein
the third antenna branch is grounded through the first grounding point.

4. The antenna of claim 1, wherein
the first frequency band signal is Wi-Fi 2.4 GHz frequency band signal, the second frequency band signal is N78 frequency band signal which is a sub 6G communications band, and the third frequency band signal is Wi-Fi 5 GHz frequency band signal.

5. A terminal device, comprising a first antenna that is the antenna of claim 1.

6. The terminal device of claim 5, further comprising a second antenna; wherein
the first antenna is spaced from the second antenna with a specified distance.

7. The terminal device of claim 6, wherein the second antenna is a Combo antenna.

8. The terminal device of claim 6, wherein the first antenna is disposed at a non-grip area of the terminal device.

9. The terminal device of claim 8, further comprising a rear camera Deco;
the non-grip area includes areas near two adjacent sides of the rear camera Deco;
the first antenna branch of the first antenna is spaced from one side of the two adjacent sides of the camera Deco with a first specified distance, the second antenna branch of the first antenna is spaced from the other side of the two adjacent sides of the camera Deco with a second specified distance, and the third antenna branch of the first antenna is disposed at a corner of the two adjacent sides.

10. The terminal device of claim 9, further comprising a battery; and
the first antenna branch or the second antenna branch is disposed between the camera Deco and the battery.

11. The terminal device of claim 10, further comprising a frame connected with the second antenna;
the first antenna branch is disposed between the camera Deco and the battery; and
the second antenna branch is disposed between the camera Deco and the frame.

12. The terminal device of claim 5, wherein the antenna further includes a first grounding point and a second grounding point;
the first antenna branch is grounded through the first grounding point; and
the second antenna branch is grounded through the second grounding point.

13. The terminal device of claim 12, wherein the third antenna branch is grounded through the first grounding point.

14. The terminal device of claim 5, wherein the first frequency band signal is Wi-Fi 2.4 GHz frequency band signal, the second frequency band signal is N78 frequency band signal which is a sub 6G communications band, and the third frequency band signal is Wi-Fi 5 GHz frequency band signal.

15. A mobile terminal, comprising a first antenna that is the antenna of claim 1, a second antenna, and a frame; wherein the first antenna is spaced from the second antenna with a specified distance, and there is no hole on the frame configured for the first antenna or the second antenna.

16. The mobile terminal of claim 15, further comprising a front display screen, a rear camera, and a rear camera Deco, wherein the first antenna is disposed adjacent to the rear camera Deco, with specified distances between the first and second antenna branches and two adjacent sides of the camera Deco so as to avoid signal interference between the first antenna and the camera Deco.

\* \* \* \* \*